May 10, 1960  D. M. COLLIER ET AL  2,936,119
SIMULTANEOUS DIFFERENTIAL EQUATION COMPUTER
Filed July 29, 1955  3 Sheets-Sheet 1

INVENTORS
Dana M. Collier,
BY Leighton A. Meeks &
James P. Palmer
ATTORNEY

INVENTOR.
Dana M. Collier,
BY Leighton A. Meeks &
James P. Palmer

ATTORNEY

United States Patent Office 2,936,119
Patented May 10, 1960

2,936,119
SIMULTANEOUS DIFFERENTIAL EQUATION COMPUTER

Dana M. Collier and Leighton A. Meeks, Oak Ridge, Tenn., and James P. Palmer, Stony Brook, N.Y., assignors to the United States of America as represented by the United States Atomic Energy Commission Application July 29, 1955, Serial No. 525,412

3 Claims. (Cl. 235—180)

The present invention relates to electronic simulators, and more especially to an electronic analog computer for solution of simultaneous differential equations, including non-linear equations, of the general type:

$$\frac{dx}{d\lambda} = a_1 x + a_2 xy + \sum_{i=0}^{n} e_i z_i \quad (A)$$

$$\frac{dy}{d\lambda} = a_4 x + a_5 y + a_6 f(\lambda) \quad (B)$$

$$\frac{dz_i}{d\lambda} = b_i z_i + c_i x + d_i y \quad (C)$$

$$i = 1, 2, 3 \ldots n$$

where $\lambda$ = a constant times time and the $a$'s, $b$'s, $c$'s, $d$'s, and $e$'s are positive or negative constants, or are functions of $\lambda$.

An entire class of engineering problems may be defined by systems of equations of the above general type. For example, one such problem, not readily solvable by any of the usual analytical methods, is that of the gross variations in power and temperature as functions of time for homogeneous nuclear reactors, that is, reactors wherein the fissionable fuel and moderator are intermixed in a homogeneous mass. While the kinetic equations describing the behavior of the general thermal-power reactor have been described, the effect of temperature changes upon reactivity is so complex that no single generalization for all types of reactors is worthwhile. For a description of homogeneous reactors, see "Introduction to Nuclear Engineering," R. Stephenson (1954), pp. 86–90. For the derivation of reactor kinetic equations, see "The Elements of Nuclear Reactor Theory," Glasstone and Edlund (1952).

Without going into the mathematical derivation here, it is considered that the behavior of homogeneous reactor systems, that is, systems including a homogeneous reactor fluid, a heat exchanger through which the fluid gives up heat to water, and a boiler for generating steam, such as the system described in Chem. Eng. Progress, May 1954, pp. 256–262, is adequately described by the following equations:

(1) $\quad \dfrac{dp}{dt} = \left[\delta - \sum\limits_{i=1}^{5} \beta_i - a(\theta_r - \theta_{r_0})\right]\dfrac{P}{\tau} + \gamma_i \lambda_i K_i$ (2) $\quad \dfrac{dK_i}{dt} = -\lambda_i K_i + \dfrac{\beta_i}{\tau} P$ $i = 1, 2, 3, 4, 5$ (3) $\quad b\dfrac{d\theta_r}{dt} = P - a(\theta_r - \theta_s)$ (4) $\quad g\dfrac{d\theta_s}{dt} = a(\theta_r - \theta_s) - P_0$ where:
P = reactor power level (megawatts) as a function of time,
t = time (sec.), $\delta$ = excess-reactivity coefficient.

$\sum\limits_{i=1}^{5} \beta_i$ = total delayed-neutron fraction = 0.00762, $a$ = temperature coefficient of reactivity = 0.00081/° C.,
$\theta_r$ = mean reactor temperature (° C.) as a function of time,
$\theta_{r_0}$ = initial mean reactor temperature, nominally 232.5° C.,
$\theta_s$ = mean temperature of the steam (° C.) as a function of time,
T = mean neutron lifetime = $10^{-4}$ sec,
$K_i$ = power contribution (megawatts) from delayed neutrons of the $i$th kind, as a function of time,
$\lambda_i$ = decay constant (sec. $^{-1}$) for delayed neutrons of the $i$th kind,
$\gamma_i$ = reduction factor for power from delayed neutrons of the $i$th kind, accounting for the fact that some delayed neutrons arise while the fuel is circulated outside the reactor and are lost to the reaction,
$b$ = reactor heat capacity = 0.175 megawatt·sec./° C.,
$a$ = heat exchanger conversion factor = 0.025 megawatt/° C.,
$g$ = heat capacity of the heat exchanger (megawatt·sec./° C.,
$P_0$ = power demanded from the boiler (megawatts).

Substituting Equation 2 into Equation 1 above, a more suitable Equation 5 may be derived:

(5)

$$\frac{dP}{dt} = \frac{\delta}{\tau}P + \left[a\theta_{r_0} - \sum_{i=1}^{5}\beta_i(1-\gamma_i)\right]\frac{P}{\tau} - \sum_{i=1}^{5}\gamma_i\frac{dK_i}{dt} - \frac{a\theta_r}{\tau}P$$

In the design of a new nuclear reactor configuration or in designing the control system for a reactor, solutions of the appropriate kinetic equations can show whether the design is satisfactory and whether the controls will be adequate under various conditions of operation. While the equations can be solved by methods of numerical analysis, investigation of the solutions for the complete range of the varying parameters may be done much more quickly and effortlessly with a reactor simulator. Moreover, after a suitable design is chosen, thoroughly investigated, and found to be adequate, the simulator, if it operates in the same period of time as does the reactor to be built, may be utilized in training reactor operators and technicians. While other reactor simulators have been built, previous models have neglected the nonlinearity that results from consideration of the temperature effects. These effects cannot be safely neglected, however, in designing homogeneous reactors.

Accordingly, it is a primary object of our invention to provide an electronic simulator for a system of simultaneous differential equations of the type given above, including a non-linear equation. A further and specific object of our invention is to provide a reactor simulator taking into account the effect of temperature on the reactor. Yet another object of the invention is to provide a reactor simulator especially suitable for simulating the behavior of homogeneous-type reactors. Still another object of our invention is to provide a training instrument for operators of nuclear reactors, operating in real time, which will simulate the actual behavior of a reactor responsive to changes in the controls by the operators. Another object of our invention is to provide an improved electronic simulator operating in real time.

These and other objects of our invention will become apparent from the following detailed description of a preferred embodiment thereof, when read in conjunction with the appended drawings, in which.

According to our invention, networks simulating each specific equation of the general type of Equations A, B, and C above, for example Equations 2–5 above, are synthesized, means are provided for differential operation, and the networks are combined in a novel manner to produce a system simulator, certain electrical voltages and currents of which will accurately represent related characteristics of a homogeneous reactor system. Non-linearities in the equations where two variables are multiplied together are solved in real time by a novel multiplier incorporated in the simulator network.

Figure 1:
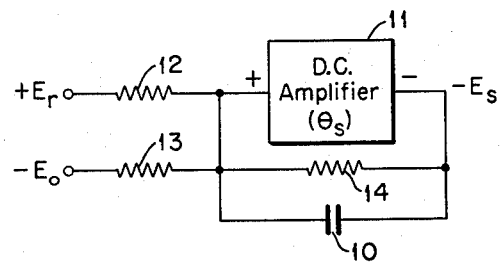
Figure 1 represents an electrical analogy for Equation 4 above.

Referring now to Figure 1, a network is shown of the general form for simulating Equation 4 above. A constant signal voltage $-E_0$, taken from a battery or other suitable source, may be applied at one input to correspond to one equation constant term, such as the power demand, $P_0$, such that $-E_0 = eP_0$, where "$e$" is a scaling factor of any desired value. A second input voltage $E_r = ea\theta_r$, is applied to a second input, corresponding to the temperature effect on reactivity. Resistors 13 and 12 are in series with the respective voltages, while resistor 14 and condenser 10 are the integrating condenser and biasing resistor connected between the output $-E_s$ and the input of the integrating D.C. amplifier. The amplifier is assumed to be a high gain feedback device whose input will not change appreciably from ground potential, and which may have a gain of over 20,000, for example. If currents associated with the respective circuit elements are denoted by $I_n$, where "$n$" corresponds to the number of the element, then in accordance with Kirchhoff's law, $I_{10} = I_\beta + I_{14} + I_{12}$. But it is evident that $$I_{10} = C_{10}\frac{dE_s}{dt}, \quad I_{14} = \frac{-E_s}{R_{14}}, \quad I_{12} = \frac{E_r}{R_{12}}, \quad I_{13} = \frac{-E_0}{R_{13}}$$

According to the above definitions of $E_r$ and $-E_0$, the network equation then may be written:

$$C_{10}\frac{dE_s}{dt} = \frac{-E_s}{R_{14}} - \frac{eP_0}{R_{13}} + \frac{ea\theta_r}{R_{12}}$$

If $R_{12}$, $R_{13}$, and $R_{14}$ are equal, and if $C_{10}$ and $R_{14}$ are chosen such that the product $$C_{10}R_{14} = \frac{g}{a}$$

then it may be seen that the network equation corresponds to the reactor Equation 4 above. The output $-E_s$ will be proportional to the steam temperature of the system.

Figure 2:
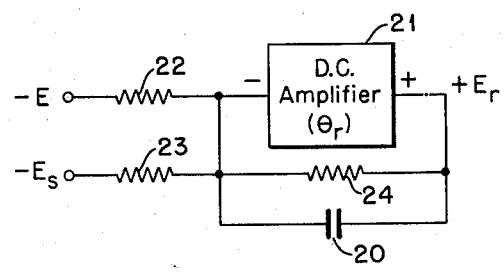
Figure 2 represents the electrical analogy of Equation 3 above.

Referring now to Figure 2, a similar analysis will show that $$-C_{20}\frac{dE_r}{dt} = \frac{E_r}{R_{24}} - \frac{E_s}{R_{23}} - \frac{E}{R_{22}}$$

Choosing components of the proper values so that the product $$C_{20}R_{24} = \frac{b}{a}$$

and letting $E = eP$, the equation takes the form of reactor Equation 3 above, and a voltage $E_r$, proportional to the mean reactor temperature, is derived.

Figure 3:
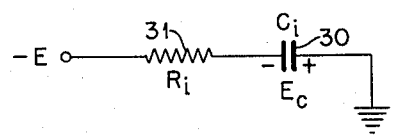
Figure 3 represents the electrical analogy of Equation 2 above.

Referring now to Figure 3, a voltage $-E$, corresponding to nuetron density, is applied to $i$ similar networks, each comprising resistor 31 and a condenser 30 in series, to simulate the $i$ groups of delayed neutron emitters. It may be seen that the current flowing in any network $$I_i = C_i\frac{dE_c}{dt} = \frac{E - E_c}{R_i}$$

If $R_i$ and $C_i$ are chosen such that the product $$R_iC_i = \frac{6}{\lambda_i}$$

and $E_c = n_iK_i$, where $n_i$ is a constant equal to $$\frac{e\lambda_i\tau}{\beta_i}$$

then the network equation becomes:

$$\frac{dK_i}{dt} = -\lambda K_i + \frac{\lambda_i e}{n_i}P$$

This equation is of the form of Equation 2 above, and currents proportional to the power contribution of the $i$ groups of delayed neutron emitters are derived.

Figure 4:
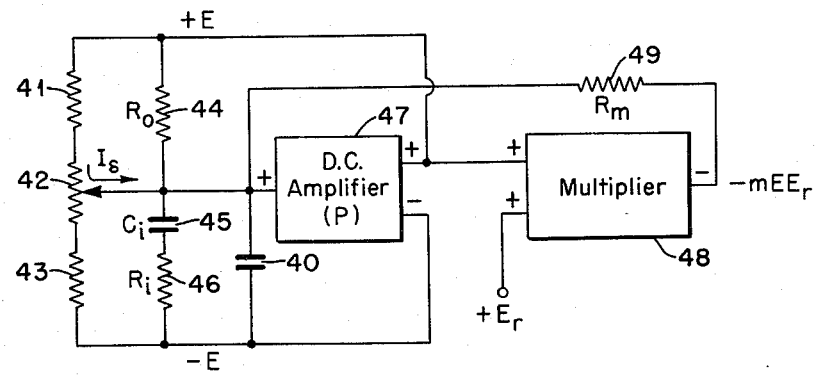
Figure 4 represents the electrical analogy of Equation 5 above.

Referring now to Figure 4, the analog for non-linear Equation 5 above may comprise a D.C. amplifier 47, a multiplier 48, the excess reactivity network 41, 42, 43 connected across the amplifier output ($+E-E$), bias integrating condenser 40, resistor 49, and $i$ delayed neutron-emitter R–C networks $R_iC_i$, only one of which is shown for simplicity. If the amplifier is a high-gain, high-impedance feedback device, so that its input will remain at ground potential, or very nearly so, then the equation for the network is:

$$I_{40} = I_\delta + I_{44} + \sum_{i=1}^{5}I_i + I_{49}$$

It may be seen that $$I_{40} = C_{40}\frac{dE}{dt}$$

and $$I_{44} = \frac{E}{R_{44}}$$

and it is shown above that $$\sum_{i=1}^{5}I_i = -\sum_{i=1}^{5}C_i\frac{e\lambda_i\tau}{\beta_i}\frac{dK_i}{dt}$$

The multiplier receives input voltages $E$ and $E_r$ and gives an output voltage $-mEE_r$, so that $$I_{49} = \frac{mEE_r}{R_{49}}$$

Then it may be seen that:

$$C_{40}\frac{dE}{dt} = I_\delta + \frac{E}{R_0} - \sum_{i=1}^{5}C_i\frac{e\lambda_i\tau}{\beta_i}\frac{dK_i}{dt} - \frac{mEE_r}{R_m}$$

To obtain a value for $I_\delta$, let $R_{41} = R_{43}$. Then it may be shown that $$(I_\delta) \max = \frac{E}{R_{41}\left(1 + \frac{R_{41}}{R_{42}}\right)}$$

If $$\frac{\delta}{\delta \max} = \frac{I_\delta}{(I_\delta) \max} \text{ and } \frac{R_{41}}{R_{42}} \geq 5$$

then $\delta = D\delta$ max, where D is the distance of the arm of potentiometer $\delta = D\delta$ max being $+1$ at the $+E$ end and $-1$ at the $-E$ end. Further substitution and manipulation of the equation will bring it into the form of Equation 5 above if components are selected such that $$C_{40} = \frac{\tau}{R_{41}\left(1+\frac{R_{41}}{R_{42}}\right)^{\delta \max}} = \frac{C_i \lambda_i \tau}{\beta_i \gamma_i}$$

$$= \frac{am e \tau}{aR_m} = \frac{\frac{\tau}{R_0}}{a\theta_{r_0} - \sum_{i=1}^{5}\beta_i(1-\gamma_i)}$$

It has been found that analog computers including D.C. amplifiers tend to drift badly and may become so inaccurate as to be virtually useless, so that a combination of the networks of Figs. 1–4 would not be satisfactory. To overcome the drift problem, difference amplifiers were employed, rather than the standard D.C. amplifiers. It has been found that similar amplifier stages, operating under the same conditions, tend to drift in similar amounts, so that if the difference between the output voltages of two similar stages be taken as an output, it is practically free from drift. In addition, we have found that addition and subtraction are more easily accomplished when both positive and negative signals are available at every point in the networks. Use of difference amplifiers makes such opposite polarity signals available very conveniently. Moreover, certain circuit techniques used in the multiplier utilize both positive and negative signals for better operation.

Figure 5:
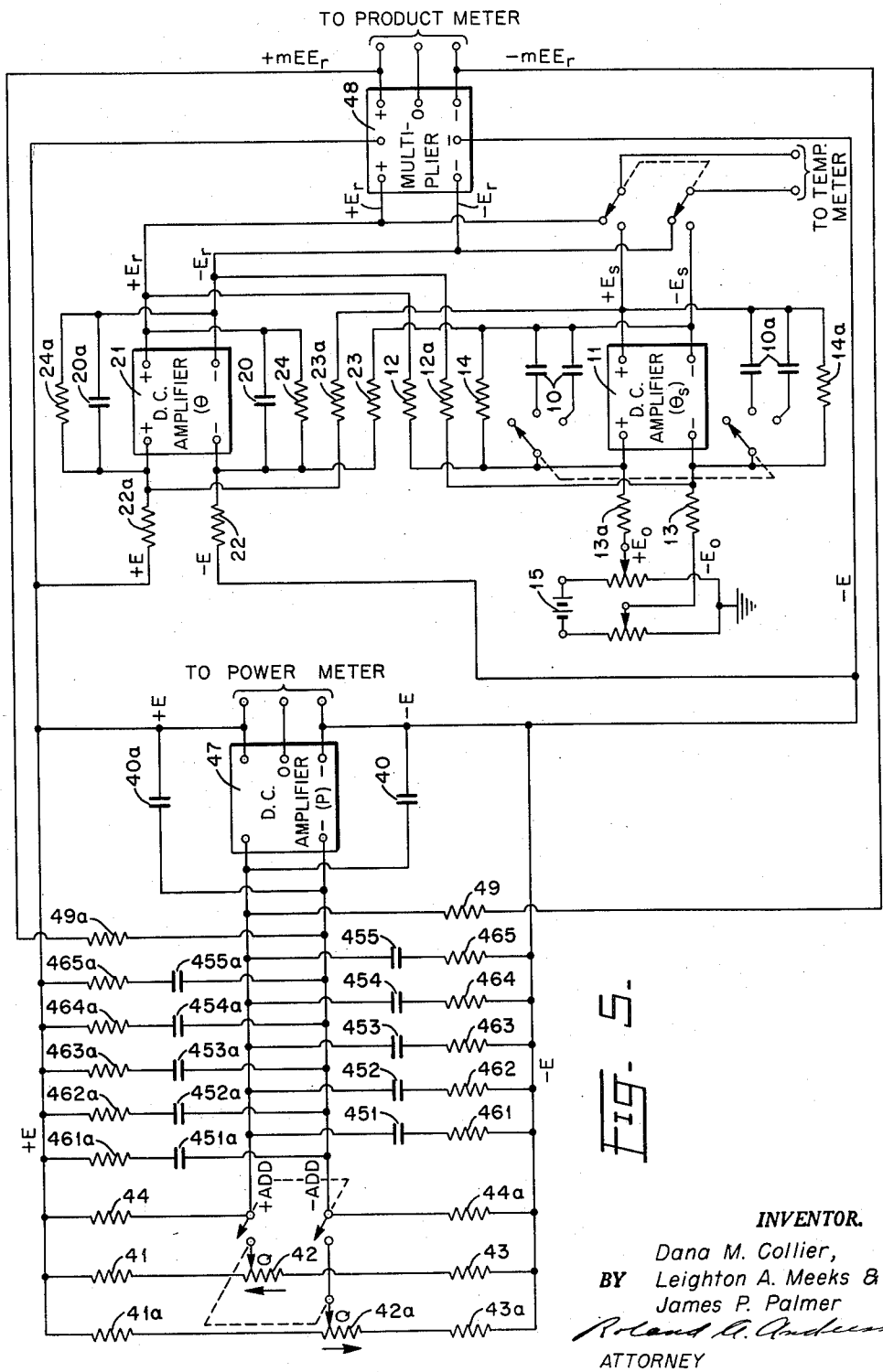
Figure 5 represents a combined network which forms the electrical analog of the homogeneous reactor kinetic equations.

Figure 5 illustrates a block diagram of the completed simulator utilizing difference amplifiers. To illustrate how the networks of Figures 1–4 are synthesized into the simulator, the numerals designating the components of the block diagram correspond to those in the respective networks. Since duplicate components are required when utilizing difference amplifiers rather than single input amplifiers, these duplicate components are numbered to correspond with the original components, with the addition of the letter "$a$." For example, resistor 46 and condenser 45 form the network indicated by $R_i$ and $C_i$ in Figure 4. As indicated in connection with the equations represented by Figure 4 "$i$" may take values from 1–5. Therefore, in Figure 5, resistors 461–465 represent $R_i$ and condensers 451–455 represent $C_i$. Their duplicate components are represented by resistors 461$a$–465$a$ and condensers 451$a$–455$a$. To furnish the voltages $+E_0$ and $-E_0$, a source of 20 volts potential is indicated by the numeral 15. In addition, connections for various recording meters which will indicate the magnitude of the variables of interest in equation solution, such as reactor power, temperature, and the product $mEE_r$, for the reactor simulator, are shown. Fast transients may be recorded on an oscillograph.

The simulator may comprise three D.C. difference amplifiers 11, 21, 47, together with their respective input and output networks, and multiplier 48. A voltage $\pm E_0$ is manually selected through the potentiometers connected to battery 15 and fed to amplifier 11. One pair of the condensers 10, 10$a$ is selected by the ganged switch coupled thereto to establish the proper heat exchanger simulation, and output voltage $+E_s$, $-E_s$ are derived proportional to the reactor temperature. The voltages may be measured and recorded on the temperature meter by suitable positioning of the ganged switch connected to the meters. A current proportional to $-E_s$ is supplied through resistor 23 to one input of amplifier 21, together with a current proportional to $-E$ from the output of amplifier 47. The other input to amplifier 21 is supplied with currents proportional to $E_s$ and to $E$ through resistors 23$a$ and 22$a$, while output voltages $E_r$, $-E_r$ are derived and fed to multiplier 48. The output voltages may be recorded on the temperature meter as desired. Voltages $E$, $-E$ are also supplied the multiplier, and output voltages proportional to the products $-mEE_r$ and $+mEE_r$ are derived. These output voltages are recorded on the product meter and are fed to the inputs of amplifier 47 through resistors 49, 49$a$. Other inputs include R.C. networks 451–455, 461–465, simulating the five groups of delayed neutron emitters, bias resistor 44, and potentiometer network 41–43, which is provided with a movable arm Q for selecting the reactivity $\delta$, which setting determines the current $I_\delta$. The outputs of amplifier 47 are voltages $E$ and $-E$, simulating neutron density, which may be recorded on the power meter. One set of suitable values for the circuit elements and for the coefficients of the above equations is shown in Table 1.

Table 1

| | | |
|---|---|---|
| $e$ = 10 v./megawatt | $R_{41} = R_{43}$ = 50,000 ohms | $\frac{g}{a}$ = 0, 7, 70 sec. |
| $C_{40}$ = 0.02 μfd. | Q = 10,000 ohms | $C_{40}$ = 0, 2.33, 23.33 μfd. |
| $\delta$ = 0.01667 | $R_{14}$ = 100,750 ohms | $R_{14}$ = 3.0 megohms |
| $\frac{b}{a}$ = 7 sec. | $C_{20}$ = 2.33 μfd. | $R_{14}$ = 3.0 megohms |
| $m$ = 0.016/volt | $R_{49}$ = 25,000 ohms. | |

| $i$ | $\gamma_i$ | $\beta_i$ | $\lambda_i$ (sec$^{-1}$) | $R_iC_i$ (sec) | $C_i$ (μfd.) | $R_i$ (megohms) |
|---|---|---|---|---|---|---|
| 1 | 1.00 | 0.00030 | 14.00 | 0.0714 | 0.00432 | 16.5 |
| 2 | 1.00 | 0.00087 | 1.61 | 0.622 | 0.1086 | 5.73 |
| 3 | 0.904 | 0.00250 | 0.456 | 2.190 | 0.988 | 2.22 |
| 4 | 0.819 | 0.00218 | 0.154 | 6.49 | 2.32 | 2.80 |
| 5 | 0.810 | 0.00177 | 0.0315 | 31.80 | 9.08 | 3.50 |

Figure 6:
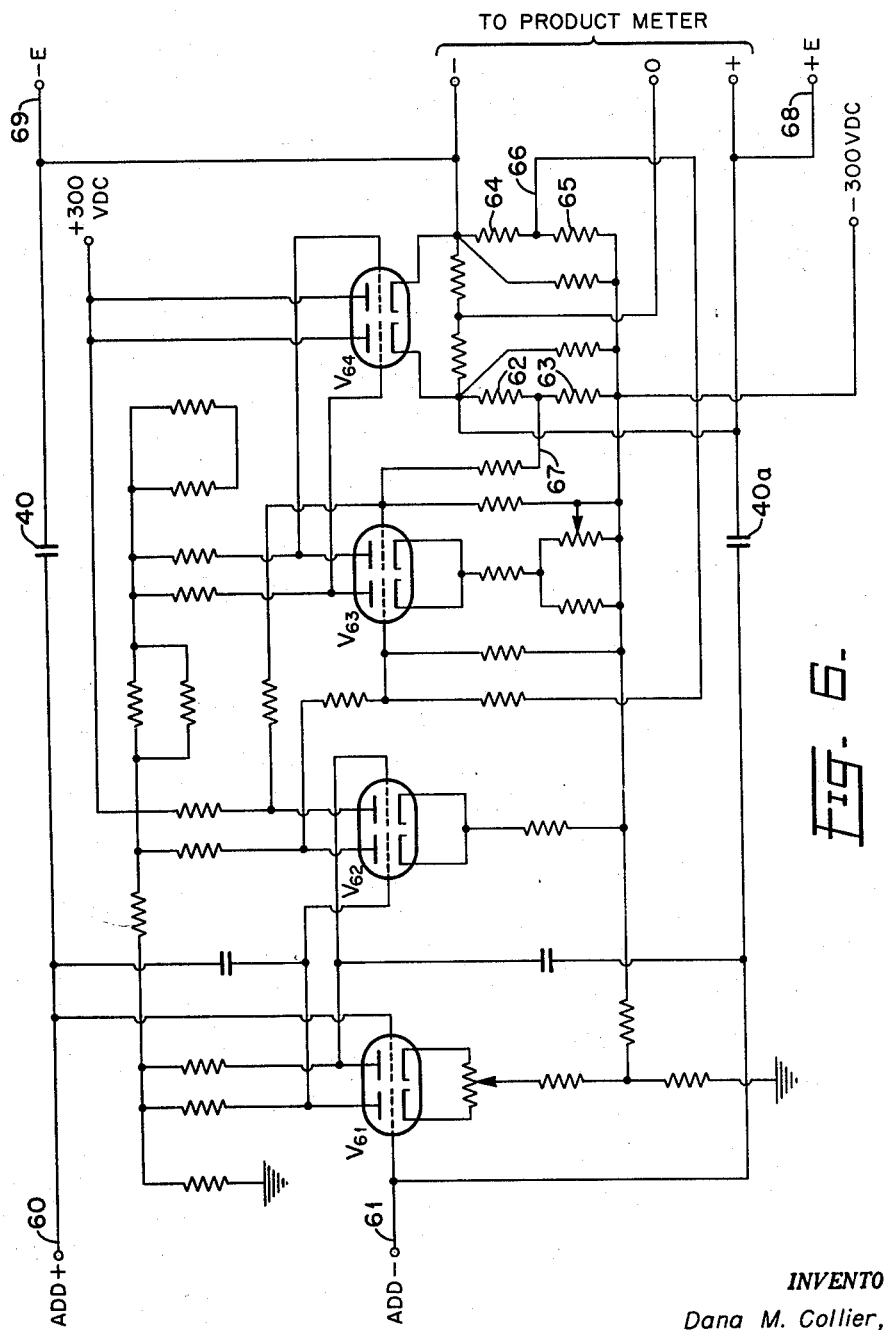
Figure 6 illustrates schematically a preferred form of D.C. amplifier utilized in the networks.

Referring now to Figure 6, a schematic diagram of a preferred difference amplifier is shown. Using for example amplifier 47, input signals are received on leads 60, 61 and coupled to the respective control grids of the cathode-coupled amplifier twin-triode tube V61. Outputs are taken from the respective plates of the triodes and coupled to the respective grids of the cathode-coupled twin triode V62. In like manner, signals are taken from the respective plates of V62 and coupled to the respective grids of cathode-coupled twin triode V63, and output signals are taken from the plates of V63 and coupled to the control grids of cathode-followers V64. A portion of the signal developed across the respective cathode resistors 62—63 and 64—65 of each of the sections of V64 is fed back along leads 66, 67 to the grids of tube V63. Condensers 40, 40$a$ feed back the output voltages to respective inputs. Positive and negative outputs may be taken from leads 68, 69, and additional outputs may be taken as shown to actuate a meter to indicate the magnitude of the function of interest. Vacuum tubes utilized in a preferred embodiment of the circuit include type 6SN7 or 12AU7 for V61, type 6SU7 for V62 and V63, and type 6BL7 for V64. To keep the drift low, the input tube is preferably operated at reduced heater voltage of 5.8 volts, reduced plate voltage of 23 volts, and at low space current, about 60 microamperes. The differential gain of the amplifier is over 20,000, with a common-mode gain of less than one. Since the amplifier has unity feedback, the deviation from linearity is less than one part in 20,000.

A suitable multiplier is described in divisional application S. N. 635,556.

It will be apparent to those skilled in the art that we have provided a novel electronic simulator for solving a general type of simultaneous differential equations, one specific example of which, describing a homogeneous nuclear reactor system, has been described.

Having described our invention, we claim as novel:

1. An analog computer for solving a system of simultaneous differential equations including both linear equations and one non-linear equation including the product of two variables comprising: first, second, and third integrating amplifiers having respective input and output networks analogous to the terms of said linear equations; means for providing said first integrating amplifier with an input signal proportional to a constant term in said equations; means connecting said first integrating amplifier output circuit with said second integrating amplifier input circuit; means connecting said second integrating amplifier output circuit with said first integrating amplifier input circuit; multiplier circuit means connected to the output circuits of both said second and third integrating amplifiers for continuously generating an output signal proportional to the product of the signals received therefrom; means connecting the output circuit of said third integrating amplifier to the input circuit of said second amplifier; feedback circuit means coupling said multiplier circuit output signal to the input circuit of said third integrating amplifier; and means for measuring the signals at selected points in said computer.

2. An electronic simulator of the character described comprising; first, second, and third high-gain D.C. amplifiers provided with input and output networks, said first amplifier having a pair of outputs; an electronic multiplier circuit having first and second inputs coupled respectively to a first of said pair of outputs and to the output of another of said amplifiers, and an output coupled to the input of said first amplifier; a potentiometer connected across said first amplifier outputs and provided with an arm coupled to said first amplifier input; a plurality of series resistance-capacitance circuits and a shunting capacitance coupling the input with the second output of said first amplifier; first resistance means coupling said first output with said first amplifier input; a second resistance and a parallel second capacitance coupling the output and input of said second amplifier; a third resistance and a parallel third capacitance coupling the output and input of said third amplifier; means for introducing an electrical signal to the last named input; respective resistance means coupling said second amplifier output to said last-named input and said third amplifier output to said second amplifier input; and means for measuring selected electrical quantities at points in said simulator.

3. An electronic simulator for a homogeneous reactor system including a neutronic chain reactor of variable reactivity, a heat exchanger through which the active fluid flows, and means for dissipating the heat from the output of said exchanger, which comprises: first, second, and third high gain amplifiers having inputs and outputs and provided with respective integrating capacitances and biasing resistors connected between their inputs and outputs, the output of said first amplifier being proportional to the neutron density in said reactor; means for deriving a composite input signal for said first amplifier comprising a potentiometer connected across the output of said first amplifier and adjustable to correspond to the reactivity of said reactor for generating a first signal proportional to the product of the neutron density and the reactivity of said reactor, and a plurality of series resistance-capacitance circuits connected to said first amplifier output for generating a plurality of signals proportional to the density of delayed neutron emitters; means for deriving an input signal for said second amplifier comprising a variable source of voltage coupled to said input and adjustable proportional to the power demand from said system and resistance means connected to said third amplifier output to provide an input proportional to the reactivity due to the temperature in said reactor; means for deriving an input signal for said third amplifier comprising means connected to said first amplifier output to provide an input proportional to said neutron density and means connected to said second amplifier output to provide an input proportional to the reactivity due to said steam temperature; multiplying means having a first input coupled to said third amplifier output to receive said signal proportional to reactivity due to reactor temperature, a second input coupled to said first amplifier output to receive a signal proportional to said neutron density, and an output coupled to said first amplifier input to provide a signal thereto proportional to the product of said neutron density and temperature change in reactivity; and means for measuring electrical signals at selected points in said simulator.

References Cited in the file of this patent

UNITED STATES PATENTS

| | | |
|---|---|---|
| 2,459,106 | Hardy | Jan. 11, 1949 |
| 2,494,036 | Darlington | Jan. 10, 1950 |
| 2,519,262 | Lovell | Aug. 15, 1950 |
| 2,710,348 | Baum et al. | June 7, 1955 |
| 2,735,616 | Hoadley | Feb. 21, 1956 |

OTHER REFERENCES

Proc. of the IRE (MacNee), November 1949, pp. 1315–1324.

Trans. of the AIEE (Pagels), 1951, pp. 1422–1426.

Electronic Analog Computers (Korn and Korn), 1952, pp. 178–181.

Proc. of the IRE (Meneley et al.), October 1953, pp. 1487–1496.

USAEC Publication, ORNL–1572, The HRE Simulator (Collier et al.), September 1954.

UNITED STATES PATENT OFFICE
CERTIFICATE OF CORRECTION

Patent No. 2,936,119            May 10, 1960

Dana M. Collier et al.

It is hereby certified that error appears in the printed specification of the above numbered patent requiring correction and that the said Letters Patent should read as corrected below.

Column 1, lines 56 to 59, equation (1), after "$\frac{P}{r} +$" insert -- $\sum_{i=1}^{5}$ --; column 3, line 32, for "$-E_0=eP_0$" read -- $-E_0=-eP_0$ --; column 4, line 4, for "nuetron" read -- neutron --; lines 12 to 14, the equation should appear as shown below instead of as in the patent:

$$R_i C_i = \frac{1}{\lambda_i}$$

lines 37 to 38, for that portion of the equation reading $$+ \sum_{i=1} I_i + \quad\quad \text{read} \quad\quad + \sum_{i=1}^{5} I_i +$$

same column 4, line 74, for "$\delta=D\delta$ max" read -- 42 from the center, --; column 5, line 61, for "voltage" read -- voltages --; column 6, Table 1, second column, third line thereof, for "$R_{14}$" read -- $R_{44}$ --; same Table 1, third column, second line thereof, for "$C_{40}$" read -- $C_{10}$ --; same column 6, same Table 1, third column, fourth line thereof, for "$R_{14}$" read -- $R_{24}$ --.

Signed and sealed this 18th day of April 1961.

(SEAL)
Attest:

ERNEST W. SWIDER
Attesting Officer

DAVID L. LADD
Commissioner of Patents